April 26, 1932.   J. W. LONG ET AL   1,855,841
SYSTEM FOR COLLECTING AND DISSEMINATING INFORMATION
Filed July 10, 1930   3 Sheets-Sheet 1
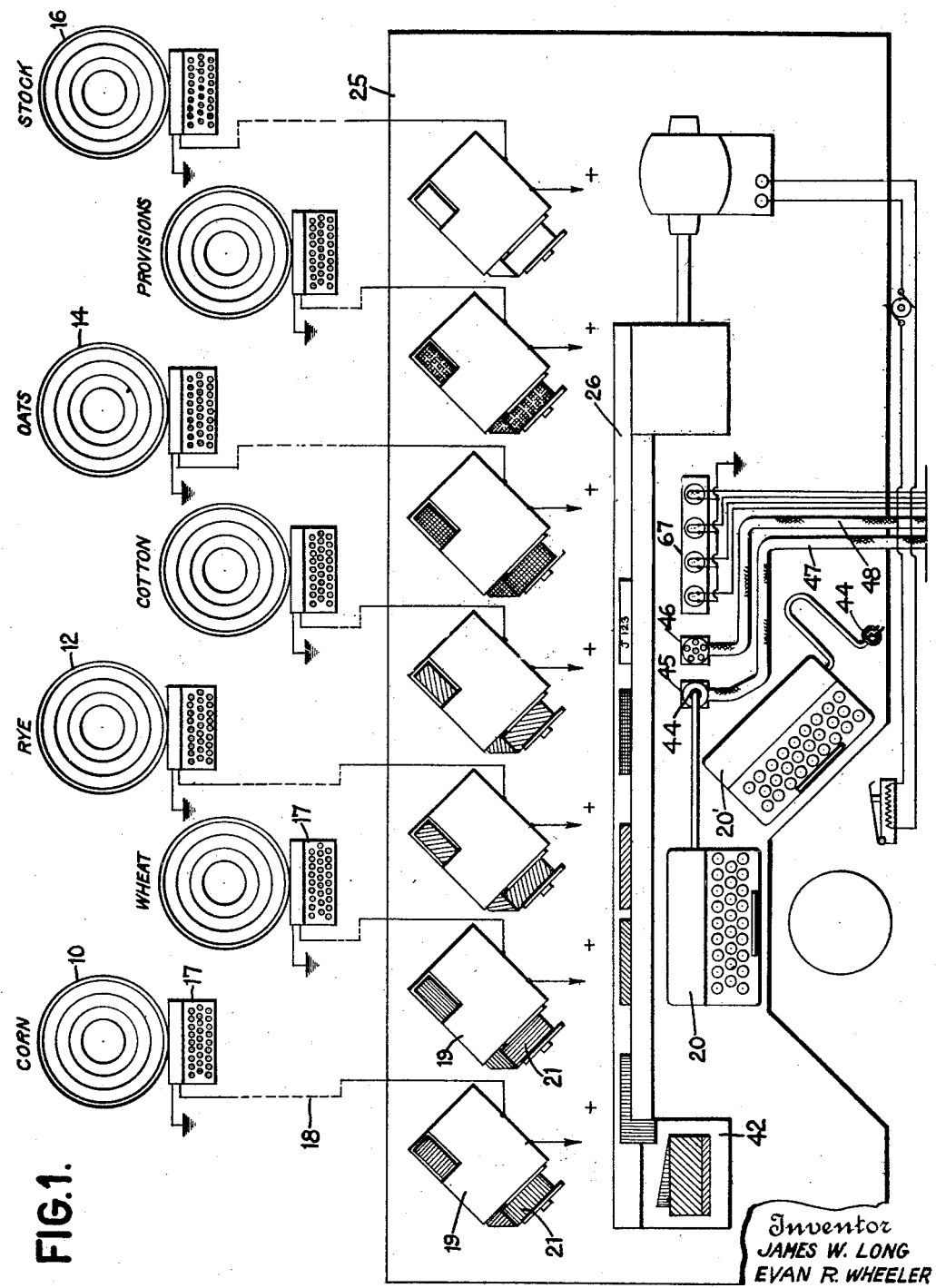

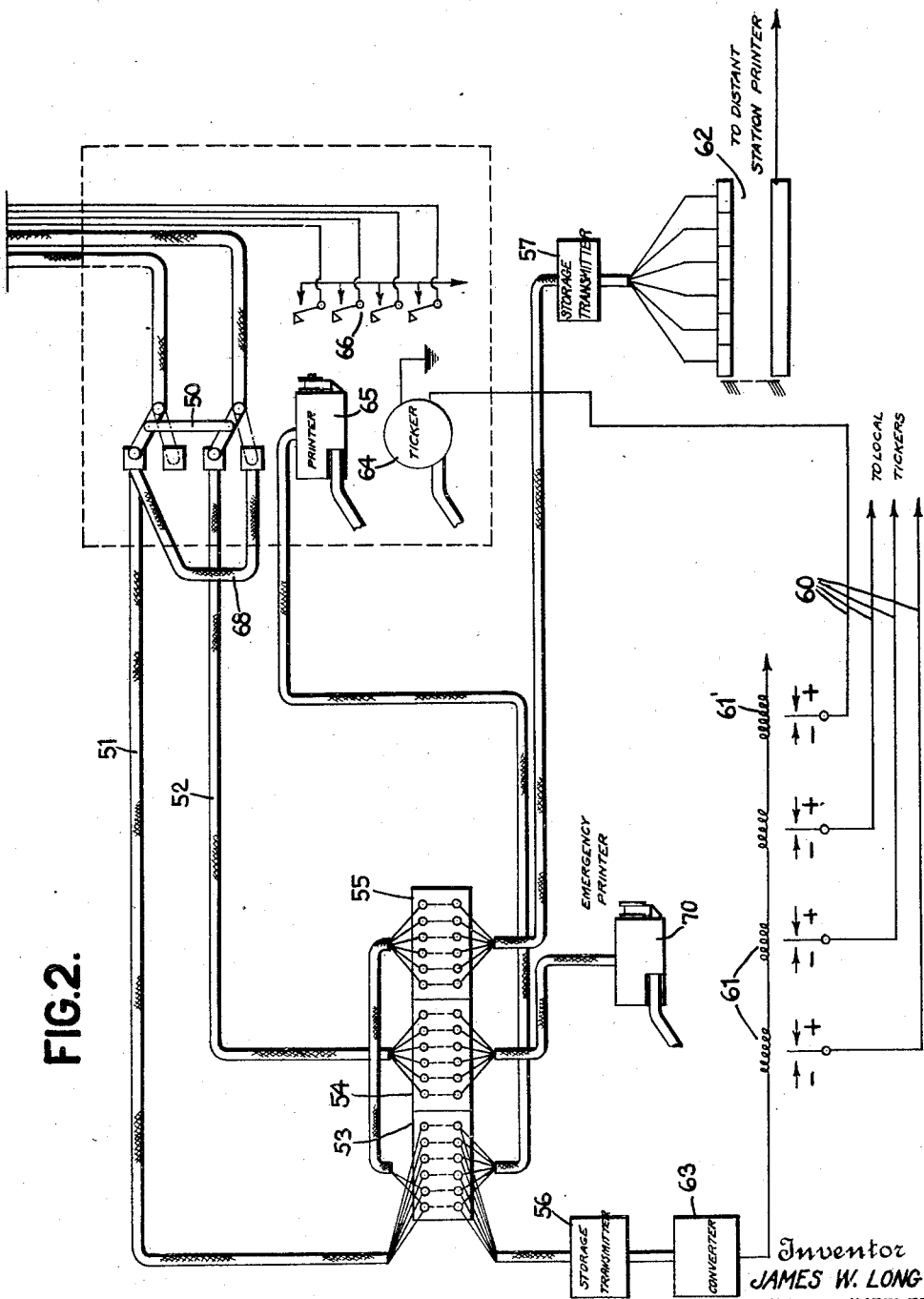

April 26, 1932.  J. W. LONG ET AL  1,855,841
SYSTEM FOR COLLECTING AND DISSEMINATING INFORMATION
Filed July 10, 1930  3 Sheets-Sheet 3
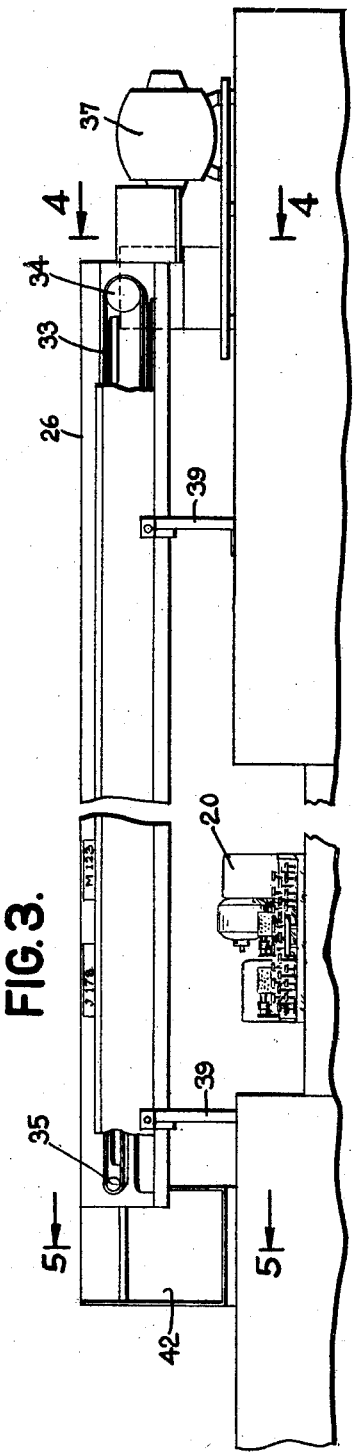
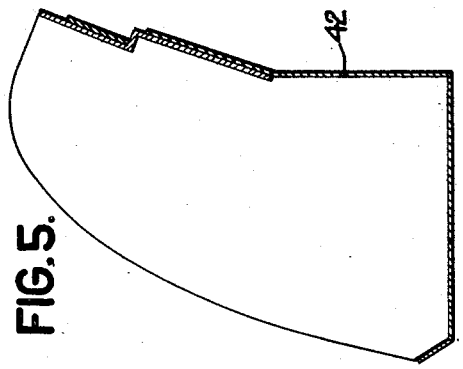
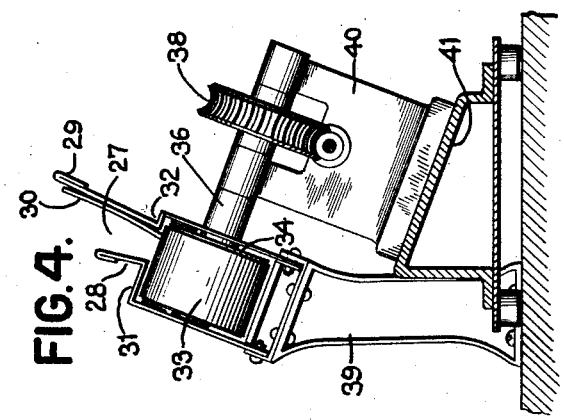
Inventor
JAMES W. LONG
EVAN R. WHEELER
By their Attorney
Eugene E. Brown Patented Apr. 26, 1932

1,855,841

UNITED STATES PATENT OFFICE

JAMES W. LONG, OF PLAINFIELD, AND EVAN R. WHEELER, OF NORTH PLAINFIELD, NEW JERSEY, ASSIGNORS TO THE WESTERN UNION TELEGRAPH COMPANY, OF NEW YORK, N. Y., A CORPORATION OF NEW YORK

SYSTEM FOR COLLECTING AND DISSEMINATING INFORMATION

Application filed July 10, 1930. Serial No. 467,084.

This invention relates to a system and apparatus for collecting and disseminating information. It is particularly applicable to the gathering of records of trades and transactions occurring on the floor of a security or commodity exchange for distribution on a quotation ticker net work, but is not limited thereto. It will be described, however, by way of example with special reference to the conditions and problems of the Chicago Board of Trade.

Two general methods of collecting the records of transaction occurring on the floor of an exchange have been used heretofore. In the first of these methods, and that previously employed by the Chicago Board of Trade, the transactions to be printed on the ticker tape are written by hand on a slip of paper by a reporter who is stationed in a booth adjacent each trading pit. The transactions are given to the reporter by the trader through the use of a hand signal. This record slip is then placed on a mechanical conveyor system and sent to a central point where a clerk removes the slip and places the same before a master key board operator who transmits the quotation over the ticker net work.

This system has the disadvantages of the overhead carrier construction and the possibility of messages being blocked in transit. The distance the carrier can travel is limited by the power of the moving force, such as a spring, available for actuating the carrier and the permissible time interval between the reporting of a transaction and the delivery of the record thereof to the master key board operator. In the mechanical conveyor system heretofore employed by the Chicago Board of Trade a maximum time of about ten seconds was allowed for transmitting the message or quotation to the master key board position. In such a system it is necessary, therefore, that the master key board position be located relatively near all of the trading positions.

A typical example of the second method of collecting and recording transactions is that used by the New York Stock Exchange in connection with their ticker transmission service for stocks. The principle of this plan is the elimination of the manual transmission on a master key board at a central control point and the direct transmission from various positions on the floor of the exchange. Several key board perforators are located at different parts of the floor and adjacent to each perforator is a tape transmitter electrically connected to a sector of a collator or automatic switching device. The records are written on a pad of paper by reporters mingling among the traders and the record slips are taken to one of the key board operators for transmission over the ticker net work through the automatic switch, which permits each tape transmitter to send over the net work in succession.

There is an appreciable time lag between the time the trade is made and the appearance of the corresponding quotation on the ticker due to the fact that the key boards are not located directly beside the group of traders and considerable time is lost between the trade and its appearance at the key board position. Moreover, there is an inherent time lag between the perforation of the tape and its passage through the tape transmitter, the minimum time lag under the most favorable conditions being about six to eight seconds and this is increased when there are several tape transmitting positions which must send in a predetermined sequence to the tickers.

This system furthermore requires a complex net work of circuits and since each transmitting circuit is not independent of the others there is a possibility of trouble occurring which may tie up the entire system.

One of the objects of the present invention is to provide an improved system for collecting information from a number of stations and distributing the same in correlated form, which will be simple, reliable and rapid and which will overcome some of the defects of the systems referred to above.

Another object is to provide such a system in which the distributing center may be located remote from the individual collecting stations and trading positions and in which the time lag incident to the transmission of a report to the distributing center will be negligible.

A further object is to enable the information emanating from each of the collecting stations to be transmitted to the central distributing point or master key board position instantly upon the receipt thereof by the reporter.

Other objects and advantages will subsequently appear.

In the carrying out of these objects we propose to provide a master key board position remote from the collecting stations and to employ an individual telegraph printing circuit and apparatus between each collecting station or trading position and the master key board position. The system contemplates the use of a special form of telegraph printer of the character fully set forth in a co-pending application of Long and Sortore, Serial No. 381,567, filed January 27th, 1929 and entitled Coupon feed mechanism for telegraph printers. Briefly, the printer comprises means for producing individual slips or coupons of a uniform length upon which each item of information or quotation is printed. The printer employs a tape about two inches wide, the printing being placed on the upper edge thereof, leaving adequate space on the slip for time stamping or applying any required pencil notations and enables the slips to be conveyed along a conveyor in a substantially vertical position past the master key board position with the printed information visible to the key board operator.

At each reporter's position there is located a key board transmitter connected by a single wire to the receiving printer provided for that particular circuit. In the case of the Chicago Board of Trade one such reporter position is located adjacent each trading pit. The transactions may be given to the reporter by the trader through the use of a hand signal, the reporter immediately operating the key board to print the quotation directly on the coupon printer at the master key board position. There is no time lag since the printing of the character is simultaneous with the depression of the key at the key board. After the printing of the last character of the quotation the tape is automatically advanced through the printer a sufficient distance to space out a coupon of predetermined length, which may be severed from the body of the tape or perforated or otherwise marked for subsequent detachment.

At the master key board position a clerk collects the coupons from the printers and places them on a short conveyor extending past the master key board where they are manually transmitted in proper sequence. A master key board may actuate a storage transmitter which sends, without lag, to all ticker circuits of the distributing net work.

In order to reduce the amount of information required to be transmitted for each transaction and thereby to increase the speed of the system, each printer may be equipped with a different colored tape, each color being representative of a particular commodity. It is, therefore, unnecessary to transmit the commodity designation except in case more than one commodity quotation is transmitted over the same printer circuit as in the case of "provisions" or stocks. The details and operation of the system will appear more fully by reference to the accompanying drawings in which:

Figures 1 and 2 are continuation views illustrating diagrammatically a collecting and distributing system embodying the present invention;

Figure 3 is a front elevation of a conveyor used in the present system;

Figure 4 is an end view of the conveyor on the line 4—4 of Figure 3; and

Figure 5 is a sectional view of a discharge end of the conveyor on the line 5—5 of Figure 3.

Referring first to Figure 1 we have shown a number of trading positions or pits 10 to 16 at which transactions in particular commodities occur, as indicated by the legends on the drawings. Adjacent each pit is a keyboard transmitter 17 before each of which a reporter or operator may be located. As transactions occur between the traders in the pits the results thereof are signaled by the trader to the reporter or operator adjacent that particular pit, preferably by a hand signal. The reporter immediately operates the keyboard transmitter to send the signals representative of the transaction to the master keyboard position.

Each transmitter is connected by a line 18 to an individual coupon printer 19 located adjacent the master keyboard 20, which may be at any desired distance from the floor of the exchange. Each machine is provided with a tape 21, preferably of a distinctive color indicative of the particular commodity dealt in at its associated pit; as for instance red for corn, blue for wheat, buff for rye, etc. Therefore, in transmitting quotations from the corn, wheat, rye, cotton and oats trading positions or pits it is not necessary to send signals representative of the particular commodity. Obviously other means may be employed for designating the commodity as by previously printing the name thereof on the tape.

In the case of provisions and stocks, symbols representative of the particular security or commodity must be transmitted in addition to the quotation. Ordinarily the information transmitted for each transaction will involve only a few characters and after the transmission of the last character the tape is automatically advanced through the machine a sufficient distance to produce coupons of uniform length.

The coupon printers 19 may be located conveniently on a relatively short table 25 closely adjacent to each other, the table also carrying a short conveyor 26 and the master keyboard transmitter 20. As each coupon is printed it is removed from the machine by a clerk and placed in succession in the conveyor 26, which is constructed so as to pass the coupon in a substantially vertical position past the master keyboard transmitter 20. The operator, through the keyboard, transmits the quotations in succession to a distributing apparatus shown in Figure 2, by which it is distributed over the ticker network.

The conveyor 26 comprises a V-shaped trough 27 (Figures 3 and 4) consisting of two diverging side walls 28 and 29, between which the coupon 30 is conveyed in an upright position. The sides of the conveyor are offset as of 31 and 32 to provide an enlarged housing through which a continuous belt 33 passes. The belt extends around rollers 34 and 35 at each end, the former being secured to a shaft 36 driven from a motor 37 through a worm gear 38 or other suitable reducing gearing.

The conveyor is supported in an inclined position from the table 25 by brackets 39 so as to cause the coupon to rest against the rear wall 29 of the conveyor, the front wall 28 being short in order to render the printing of the upper edge of the coupon visible from the master keyboard position. The incline shaft 36 bears in a block 40 supported in a wedge shaped base 41. A tray 42 is disposed at the discharge end of the conveyor and receives coupons as they are discharged from the conveyor.

A spare keyboard transmitter 20' is provided in the case of failure of the main transmitter 20 and each transmitter has a terminal plug 44 by which it may be connected to either of the receptacles 45 or 46.

Groups of cabled conductors 47 and 48 extend from the receptacles 45 and 46, respectively, to the distributing apparatus of the ticker net work which may be located in a central telegraph office at a considerable distance from the master keyboard transmitting room. The cables 47 and 48 preferably extend to the distributing mechanism by different routes so as to reduce the possibility of both cables being disabled from the same external cause. The cables terminate at a switch 50 which, in the position shown in Figure 2, continues the circuit through the cable sections 51 and 52 respectively to the upper sides of the distributing blocks 53 and 54 respectively. The cabled conductor 51 is multipled to the upper side of a third distributing block 55. The opposite terminal or lower side of blocks 53 and 55 are connected respectively to the storage transmitters 56 and 57 which may be of the construction disclosed in patent to Wheeler and Dirkes, No. 1,576,167, granted March 9, 1926. The storage transmitter 56 controls the transmission to the local ticker circuits 60 through the master relays 61, and the storage transmitter 57 operates into one channel of a multiplex telegraph system through a rotary distributor 62, for transmission to stations in remote cities where the quotations are redistributed over a local ticker network.

The tickers largely used in commodity quotation systems operate on a step-by-step signal impulses which advance the wheels around from the previous printing position to the new printing position through an escapement mechanism. For convenience the master keyboard transmitter 20 employs a 5 or 6 unit code of the Baudot type. Therefore, in order to translate the signals from one type to the other, a signal converter 63 is interposed between the storage transmitter 56 and the relays 61. This converter may be of the type described in a copending application of E. R. Wheeler, Serial No. 754,188, filed December 5, 1924.

One of the master relays 61' serves to operate a home ticker 64 used for monitorial or checking purposes against a printer 65 connected in multiple with the storage transmitter 56 through the distributing block 53, so as to be operated directly from the master keyboard 20. Discrepancies between the printer 65 and ticker 64 indicate faulty operation of the storage transmitter 56 or signal converter 63.

A group of switches 66 at the monitor's position control a bank of signal lamps 67 at the master keyboard position to enable the monitor to signal to the keyboard operation in case it is desirable, as through faulty operation of any part of the system, to shift from one keyboard transmitter to the other or or from one of the receptacles 45 and 46 to the other. In case of failure of the cable 47, switch 50 may be shifted to the dotted line position and the keyboard transmitter plugged into receptacle 46, thus completing the circuit to the distributing apparatus by cable 48 and jumper cable 68, cable section 51, and hence through the distributing blocks to the storage transmitters.

As stated above, with the switch in the full line position, the circuit from cable 48 is completed directly to the upper side of the terminal block 54. This circuit is continued through the lower terminals of the distributing block to an emergency printer 70 so that in case of failure of the distributing system to operate in a normal manner, means is provided for transmitting the quotations to the central telegraph office from which they may be manually retransmitted over any available emergency lines or equipment.

It will be noted that a system of collecting and distributing information has been provided in which the information emanating from a plurality of spaced points may be quickly collected and distributed in correlated form over the ticker net work. Obviously numerous modifications and variations of the system to adopt it to other conditions will occur to those skilled in the art and we therefore desire the foregoing detailed description to be considered illustrative as one embodiment of the invention only and not to be considered in a limiting sense.

What we claim is:

1. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers being provided with paper distinctive of a particular point of origin of information, a ticker network and a master transmitting keyboard for said ticker network located adjacent said telegraph printers, whereby information reproduced by said printers may be transmitted in succession over said ticker network.

2. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers being provided with paper of distinctive color representative of a particular point of origin of information, a ticker network and a master transmitting keyboard for said ticker network located adjacent said telegraph printers, whereby information reproduced by said printers may be transmitted in succession over said ticker network.

3. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, a ticker network and a master transmitting keyboard for said ticker network located adjacent said telegraph printers, whereby information reproduced by said printers may be transmitted in succession over said ticker network.

4. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers producing coupons containing individual items of information, a ticker network and a master transmitting keyboard for said ticker network located adjacent said telegraph printers, whereby information reproduced by said printers may be transmitted in succession over said ticket network.

5. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers producing coupons containing individual items of information and of an appearance distinctive of the origin of such item of information, a ticker network and a master transmitting keyboard for said ticker network located adjacent said telegraph printers, whereby information reproduced by said printers may be transmitted in succession over said ticker network.

6. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, a ticker network, a master transmitting keyboard for said ticker network located adjacent said telegraph printers, and a conveyor extending past said master keyboard transmitter, whereby coupons containing individual items of information may be removed from said printers and placed in said conveyor for conveyance past the master keyboard.

7. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, a ticker network, a master transmitting keyboard for said ticker network located adjacent said telegraph printers, a conveyor extending past said master keyboard transmitter, whereby coupons containing individual items of information may be removed from said printers and placed in said conveyor for conveyance past the master keyboard, and means under the control of the keyboard operator for varying the speed of said conveyor in accordance with traffic conditions.

8. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers being provided with a paper which, as it leaves the printer, is distinctive of a particular point of origin of information, a ticker network, a master transmitting keyboard for said ticker network located adjacent said telegraph printers, whereby information reproduced by said printers may be transmitted in succession over said ticker network, and a conveyor extending past said master keyboard transmitter, whereby coupons containing individual items of information may be transferred from said printers to said conveyor for conveyance past the master keyboard.

9. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers producing coupons containing individual items of information and of an appearance distinctive of the origin of such item of information, a ticker network, a master transmitting keyboard for said ticker network, located adjacent said telegraph printers, whereby information reproduced by said printers may be transmitted in succession over said ticker network, and a conveyor extending past said master keyboard transmitter whereby coupons containing individual items of information may be transferred from said printers to said conveyor for conveyance past the master keyboard.

10. Mechanism for collecting information from a plurality of spaced points and disseminating it in correlated form over a ticker network, comprising a telegraph transmitter positioned adjacent each point of origin of such information, an individual telegraph printer for each transmitter positioned at a common point, each of said printers producing coupons containing individual items of information and of an appearance distinctive of the origin of such item of information, a ticker network, a master transmitting keyboard for said ticker network, located adjacent said telegraph printers, whereby information reproduced by said printers may be transmitted in succession over said ticker network, a conveyor extending past said master keyboard transmitter whereby coupons containing individual items of information may be transferred from said printers to said conveyor for conveyance past the master keyboard, and means under the control of the keyboard operator for varying the speed of the conveyor in accordance with traffic conditions.

11. Mechanism for collecting information from a plurality of spaced points and disseminating it in correlated form over a ticker network, comprising a telegraph transmitter positioned adjacent each point of origin of such information, an individual telegraph coupon printer for each transmitter positioned at a common point, a distributing system comprising a local storage transmitter and a distant storage transmitter responsive to the operation of said master keyboard, a signal converter operated by said local storage transmitter, and a local ticker network in circuit with said signal converter.

12. Mechanism for collecting information from a plurality of spaced points comprising a telegraph transmitter positioned adjacent each point of origin of such information, an individual telegraph printer for each transmitter positioned at a common point, a line extending between each of said transmitters and associated printers and a tape for each of said printers having physical characteristics distinctive of the particular printer.

13. Mechanism for collecting information from a plurality of spaced points comprising a telegraph transmitter positioned at each of said spaced points, an individual telegraph printer for each transmitter, positioned at a common point, each of said printers producing coupons containing individual items of information and being of an appearance distinctive of the origin of such item of information.

14. Apparatus for collecting information from a plurality of spaced points and disseminating it in correlated form over a ticker network comprising a telegraph transmitter positioned adjacent each point of origin of such information, an individual telegraph recorder for each transmitter positioned at a common point, each of said recorders, recording on a medium which, as it leaves the printer, is distinctive of a particular point of origin of information, a ticker network and a transmitter for said ticker network located adjacent said telegraph recorders, whereby information reproduced by said recorders may be transmitted in succession over said ticker network.

15. Apparatus for collecting information from a plurality of spaced points and disseminating it in correlated form over a ticker network comprising a telegraph transmitter positioned adjacent each point of origin of such information, an individual telegraph recorder for each transmitter positioned at a common point, a ticker network and a transmitter for said ticker network located adjacent said recorders, whereby information reproduced by said recorders may be transmitted over said ticker network.

16. Apparatus for collecting information from a plurality of spaced points and disseminating it in correlated form over a ticker network, comprising a telegraph transmitter positioned adjacent each point of origin of such information, an individual telegraph recorder for each transmitter positioned at a common point, each of said recorders producing coupons containing individual items of information, a ticker network and a transmitter for said ticker network located adjacent said telegraph recorders, whereby information reproduced by the recorders may be transmitted over said ticker network.

17. Apparatus for collecting information from a plurality of spaced points, comprising a telegraph transmitter positioned at each of said spaced points, an individual telegraph recorder for each transmitter, positioned at a common point, said recorders producing coupons containing individual items of information and being of a character distinctive of the origin of such item of information.

18. Apparatus for collecting information from a plurality of spaced points and disseminating it in correlated form over a telegraph system, comprising a telegraph transmitter positioned adjacent each point of origin of such information, an individual telegraph recorder for each transmitter positioned at a common point, a telegraph system, transmitting means for said telegraph system, and means for transferring the records produced by said recorders to said transmitting means whereby information contained on said records may be transmitted over said telegraph system.

In testimony whereof we affix our signatures.

JAMES W. LONG.
EVAN R. WHEELER.